(12) United States Patent
Dwaraganathan et al.

(10) Patent No.: US 10,696,411 B2
(45) Date of Patent: Jun. 30, 2020

(54) AIRCRAFT SEAT WITH ERGONOMIC SLEEP COMFORTER

(71) Applicant: B/E Aerospace, Inc., Winston-Salem, NC (US)

(72) Inventors: Sivakumar Dwaraganathan, Hyderabad (IN); Rajesh Mohanam, Hyderabad (IN); Ashwin Srinivasa, Bangalore (IN); Aravinda Mahabaleshwara, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/110,177

(22) Filed: Aug. 23, 2018

(65) Prior Publication Data

US 2020/0062404 A1 Feb. 27, 2020

(51) Int. Cl.
| | | |
|---|---|---|
| *B64D 11/06* | (2006.01) | |
| *A47C 31/11* | (2006.01) | |
| *B60N 2/60* | (2006.01) | |
| *A47C 7/02* | (2006.01) | |
| *A47C 7/14* | (2006.01) | |

(52) U.S. Cl.
CPC .......... *B64D 11/0647* (2014.12); *A47C 7/021* (2013.01); *A47C 7/14* (2013.01); *A47C 31/11* (2013.01); *B64D 11/064* (2014.12); *B64D 11/0639* (2014.12); *B64D 11/0641* (2014.12); *B64D 11/0643* (2014.12)

(58) Field of Classification Search
CPC ............ B64D 11/0604; B64D 11/0639; B64D 11/064; B64D 11/0641; B64D 11/0647; B64D 2011/0069; B64D 2011/0076; A47C 7/021; A47C 7/14; A47C 31/11; B60N 2/6018
See application file for complete search history.

(56) References Cited

U.S. PATENT DOCUMENTS

| | | | | |
|---|---|---|---|---|
| 1,985,222 A | * | 12/1934 | Menhall | B60N 2/6027 |
| | | | | 297/223 |
| 2,860,691 A | | 11/1958 | Caesar | |
| 6,382,720 B1 | * | 5/2002 | Franklin | B60N 2/6027 |
| | | | | 297/221 |

(Continued)

FOREIGN PATENT DOCUMENTS

| | | | | |
|---|---|---|---|---|
| CN | 107757439 A | | 3/2018 | |
| FR | 2722962 A1 | * | 2/1996 | ............. A47C 7/425 |

OTHER PUBLICATIONS

Paperclip Design 'Meerkat Seat concept' accessed at http://www.paperclipdesign.hk/meerkat.html. published prior to at least Aug. 22, 2018. 4 pages.

(Continued)

*Primary Examiner* — Ryan D Kwiecinski
(74) *Attorney, Agent, or Firm* — Donna P. Suchy (57) ABSTRACT

A seat comforter for an aircraft seat includes a seatpan portion, a backrest portion coupled to the seatpan portion, and a sleep comforter including a flexible body configured to extend over the backrest portion and the seatpan portion, the flexible body being movable between a retracted position adjacent the backrest portion and the seatpan portion, and an extended position spaced apart from at least a portion of the seatpan portion and at least a portion of the backrest portion.

15 Claims, 7 Drawing Sheets

(56) References Cited

U.S. PATENT DOCUMENTS

| | | | |
|---|---|---|---|
| 6,402,239 B1* | 6/2002 | Haglund | B60R 21/06 |
| | | | 296/68.1 |
| 10,391,901 B2* | 8/2019 | Bergweiler | A47C 7/742 |
| 2008/0048067 A1* | 2/2008 | Pilgram | B60N 2/7011 |
| | | | 244/122 R |
| 2010/0007185 A1 | 1/2010 | Beroth et al. | |
| 2010/0109387 A1* | 5/2010 | Merensky | B64D 11/064 |
| | | | 297/75 |
| 2016/0325661 A1* | 11/2016 | Agarwal | B64D 11/0639 |
| 2018/0281648 A1* | 10/2018 | Darbyshire | B60N 2/01 |

OTHER PUBLICATIONS

Rebel Aero 'Welcome to the Future of Seating' accessed at https://www.rebel.aero/. published prior to at least Aug. 22, 2018. 1 page.
International Search Report and Written Opinion on PCT/US2019/047748 dated Nov. 4, 2019. 20 pages.

* cited by examiner

AIRCRAFT SEAT WITH ERGONOMIC SLEEP COMFORTER

BACKGROUND

Aircraft seats, such as aircrafts seats in economy cabins of an aircraft, may not provide aircraft passengers with a comfortable sleeping posture due to limited reclining ranges and a lack of support. This discomfort may, for example, prevent a passenger from sleeping on a flight.

SUMMARY

In one aspect, the inventive concepts disclosed herein are directed to an aircraft seat including a seatpan portion, a backrest portion coupled to the seatpan portion, and a sleep comforter including a flexible body configured to extend over the backrest portion and the seatpan portion, the flexible body being movable between a retracted position adjacent the backrest portion and the seatpan portion, and an extended position spaced apart from at least a portion of the seatpan portion and at least a portion of the backrest portion.

In a further aspect, the inventive concepts disclosed herein are directed to a sleep comforter for an aircraft seat. The seat comforter includes a flexible body and a body tensioning mechanism. The flexible body is coupled to the aircraft seat so as to extend over a seat area of the aircraft seat between a backrest portion of the aircraft seat and a seatpan portion of the aircraft seat. The flexible body is movable between a retracted position and an extended position. The body tensioning mechanism includes an actuator operatively coupled to a roller to drive rotation of the roller. The roller is coupled to the flexible body. The body tensioning mechanism is configured to move the flexible body between the retracted position and the extended position.

In a further aspect, the inventive concepts disclosed herein are directed to a sleep comforter for an aircraft seat. The seat comforter includes a flexible body, a body tensioning mechanism, and a body return mechanism. The flexible body is coupled to the aircraft seat so as to extend over a seat area of the aircraft seat between a backrest portion of the aircraft seat and a seatpan portion of the aircraft seat. The flexible body is movable between a retracted position and an extended position. The body tensioning mechanism includes an actuator operatively coupled to a roller. The roller is coupled to an end of the flexible body. The body tensioning mechanism is configured to move the flexible body between the retracted position and the extended position. The body return mechanism is coupled to the flexible body. The body return mechanism includes a biasing member configured to bias the flexible body towards the retracted position.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to an aircraft seat assembly 10 including an aircraft seat 24 and a sleep comforter 20. The sleep comforter 20 is coupled to the aircraft seat 24 and extends over a seating area of the aircraft seat 24 in order to enhance user comfort. The sleep comforter 20 is movable between a retracted position, in which the sleep comforter 20 rests upon or is adjacent to the aircraft seat 24, and an extended position, in which the sleep comforter 20 is tensioned so as to extend away or be spaced apart from the aircraft seat 24. A plurality of positions are available between the retracted position and the extended position to facilitate infinite position adjustment (e.g., to accommodate passenger preference and comfort, among other things). In some embodiments, the sleep comforter 20 includes a flexible body 32 and a body tensioning mechanism 36 including a ratchet mechanism 40 for applying a tension to the flexible body 32. In other embodiments, a sleep comforter includes a flexible body and a motorized body tensioning mechanism for applying a tension to the flexible body.

Figure 1:
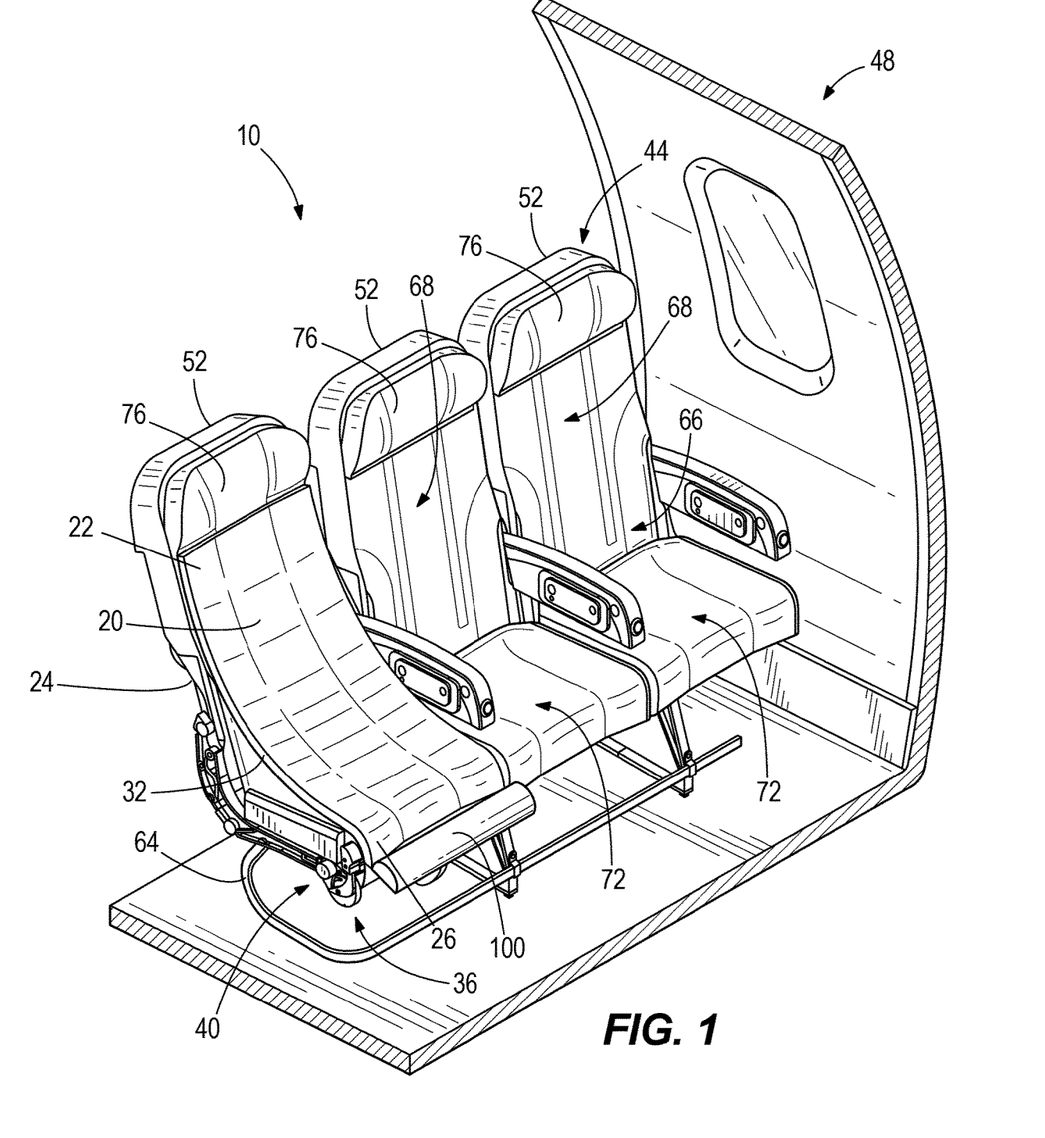
FIG. 1 is a perspective view of a seating arrangement for an aircraft having a plurality of seating units according to the inventive concepts disclosed herein.

FIG. 1 illustrates an aircraft seating arrangement 44 disposed within an aircraft 48 according to one embodiment. The aircraft seating arrangement 44 includes three aircraft seats 52. Each aircraft seat 52 includes a frame 64 fixedly coupled to at least a floor surface of the aircraft 48. The aircraft seat 52 includes a backrest portion 68 and a seatpan portion 72 supported by the frame 64. The backrest portion 68 is angled relative to the seatpan portion 72. The backrest portion 68 and the seatpan portion 72 collectively define a seating area 66. As seen in FIG. 1, the seatpan portion 72 extends approximately parallel to the floor surface of the aircraft 48 and is fixed in position. The backrest portion 68 includes a headrest 76 and is pivotally coupled the frame 64 such that the aircraft seat 52 is movable between an upright or taxi-takeoff and landing (TTOL) position (e.g., seat 52 on the right in FIG. 1) and a reclined position (e.g., seat 52 on the left in FIG. 1). In some embodiments, in the TTOL position, the backrest portion 68 is angled by approximately 90 to 110 degrees relative to the seatpan portion 72. In one embodiment, the backrest portion 68 is angled by approximately 103 degrees relative to the seatpan portion 72 in the TTOL position. In some embodiments, in the reclined position, the backrest portion 68 is angled by approximately 110 to 130 degrees relative to the seatpan portion 72. In one embodiment, the backrest portion 68 is angled by approximately 120 degrees relative to the seatpan portion 72 in the reclined position.

With continued reference to FIG. 1, the sleep comforter 20 is coupled to the aircraft seat 52 and extends over the seating area 66. More specifically, a first end 22 of the sleep comforter 20 is coupled to the aircraft seat 52 on or near the backrest portion 68 adjacent to the headrest 76, and a second end 26 of the sleep comforter 20 is coupled to the frame 64 of the aircraft seat 52 adjacent the seatpan portion 72. The sleep comforter 20 is movable between the retracted position (e.g., middle seat 52 shown in FIG. 1) and the extended position (e.g., left seat 52 shown in FIG. 1).

Figure 2:
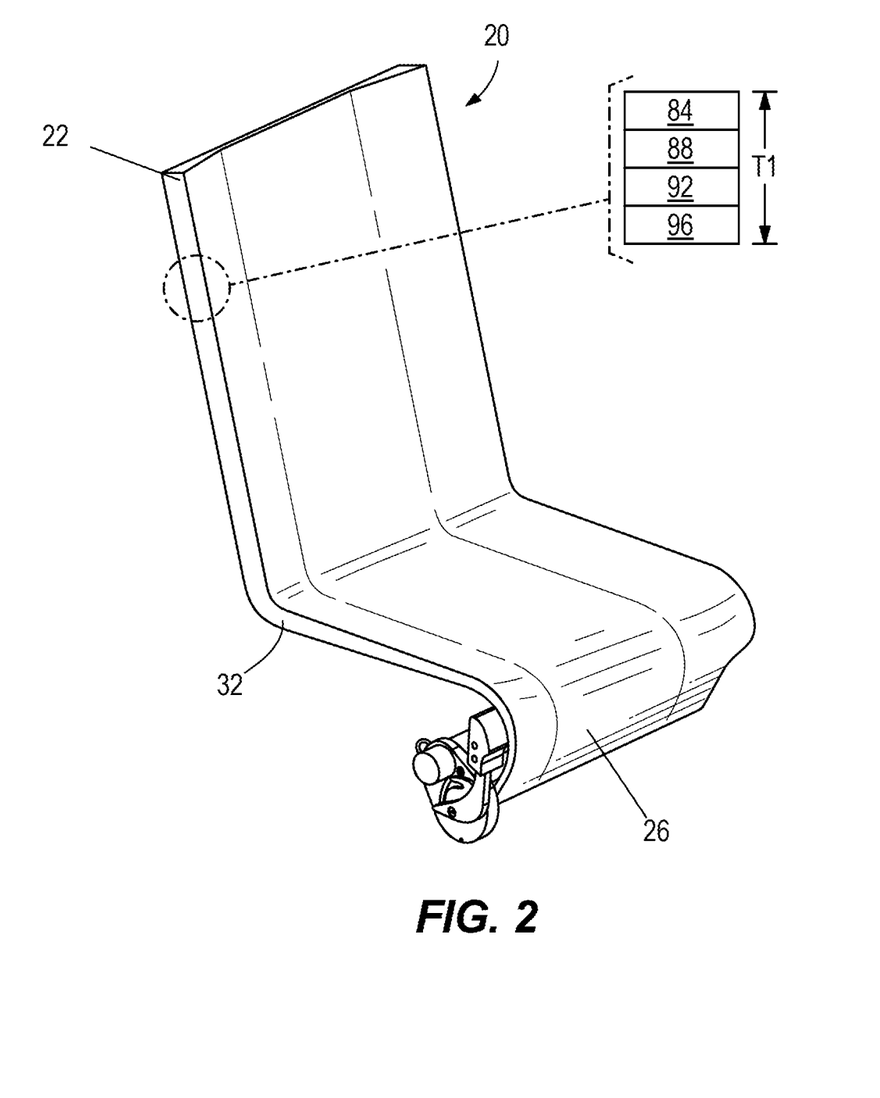
FIG. 2 is a perspective view of a sleep comforter of the seating units of FIG. 1 according to the inventive concepts disclosed herein.
Figure 3:
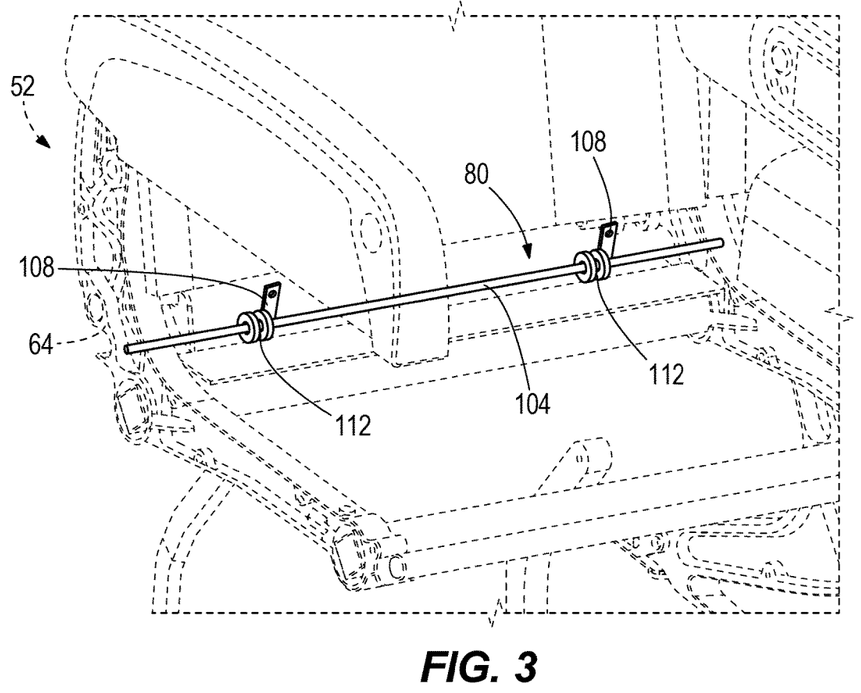
FIG. 3 is a perspective view of a body return mechanism of the sleep comforter of FIG. 2 according to the inventive concepts disclosed herein.
Figure 4:
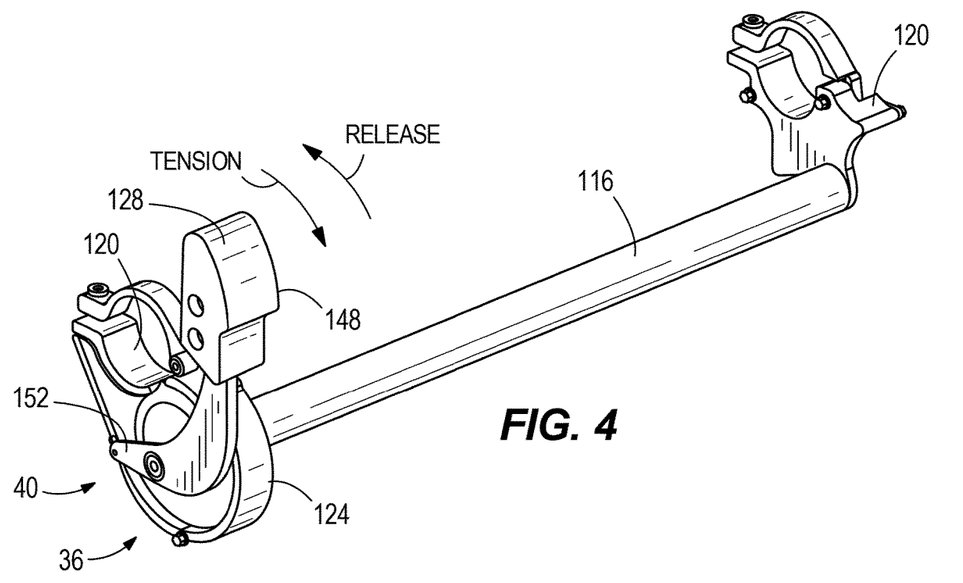
FIG. 4 is a perspective view of a body tensioning mechanism of the sleep comforter of FIG. 2 according to the inventive concepts disclosed herein.

With reference to FIGS. 2-4, the sleep comforter 20 includes the flexible body 32, the body tensioning mechanism 36, and a body return mechanism 80. In the illustrated embodiment, the flexible body 32 has a layered construction and includes a fabric layer 84, a fire retardant layer 88, a foam layer 92, and a nylon layer 96. The fabric layer 84 forms a user contact surface or outer surface facing away from the seating area 66. The nylon layer 96 forms a seat contact surface and faces the seating area 66. The fabric layer 84 may be any fabric or material, such as aerospace grade fabric, that provides a comfortable surface for user support. The foam layer 92 may be any cushion, padding, or foam that enhances the support and comfort provided by the sleep comforter 20. The nylon layer 96 may be nylon or any other similar material capable of sustaining loads under tension. In one embodiment, this type of construction leads to a sleep comforter 20 having a thickness T1 between approximately 0.5 inches to 2.5 inches.

In other embodiments, the layered construction of the sleep comforter 20 may be altered to add additional layers, remove layers, or substitute other materials in place of another layer. For example, the sleep comforter 20 may include two or more foam layers or two or more nylon layers in addition to or in place of the other layers described above.

In one embodiment, the aircraft seat 52 may include an adjustable thigh support 100 pivotally coupled to the frame 64 adjacent the seatpan portion 72. The adjustable thigh support 100 may be actuated by a user to move between an active position (e.g., FIG. 7) and an inactive position where the adjustable thigh support 100 is pivoted underneath the seatpan portion 72.

With reference to FIG. 3, the body return mechanism 80 includes a rod 104 (e.g., an elongated member), which is mounted on the frame 64 of the aircraft seat 52, and a pair of extendable coupling members 108 supported on the rod 104 and biased into a retracted position by biasing members 112 (e.g., springs such as constant torque springs). As shown in FIG. 3, the rod 104 is mounted on the frame 64 adjacent the intersection of the backrest portion 68 and the seatpan portion 72 (e.g., at or near a junction of the backrest portion 68 and the seatpan portion 72). The extendable coupling members 108 are coupled to the flexible body 32 (e.g., via hook and loop fasteners, snap fasteners, integral formation, etc.) and are movable between a retracted rest position and an extended position. In operation, the biasing members 112 act to pull the flexible body 32 towards and into contact with and/or adjacent to the seating area 66.

Figure 5:
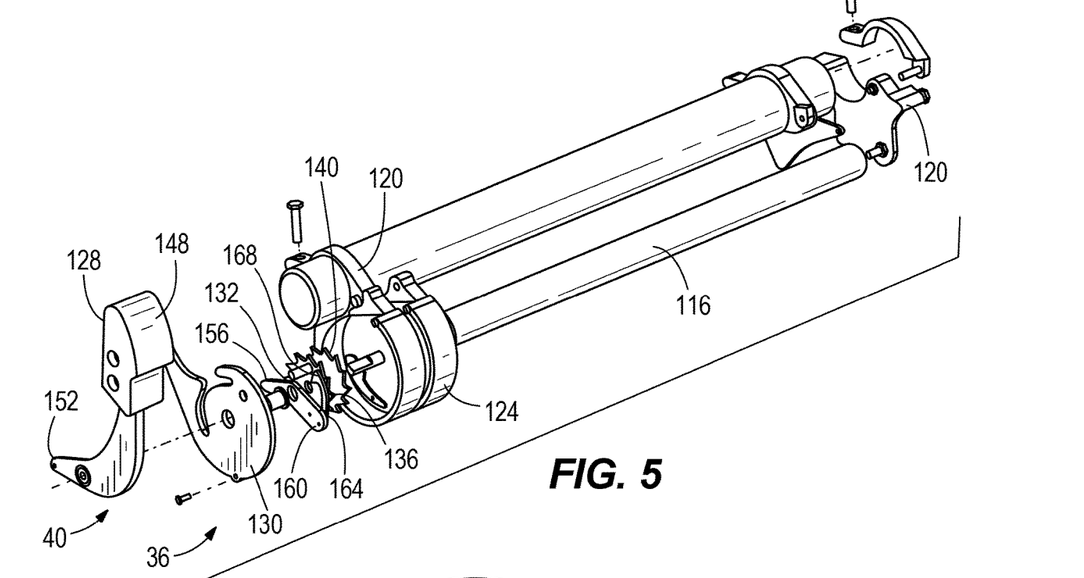
FIG. 5 is an exploded view of the body tensioning mechanism of FIG. 4 according to the inventive concepts disclosed herein.
Figure 6:
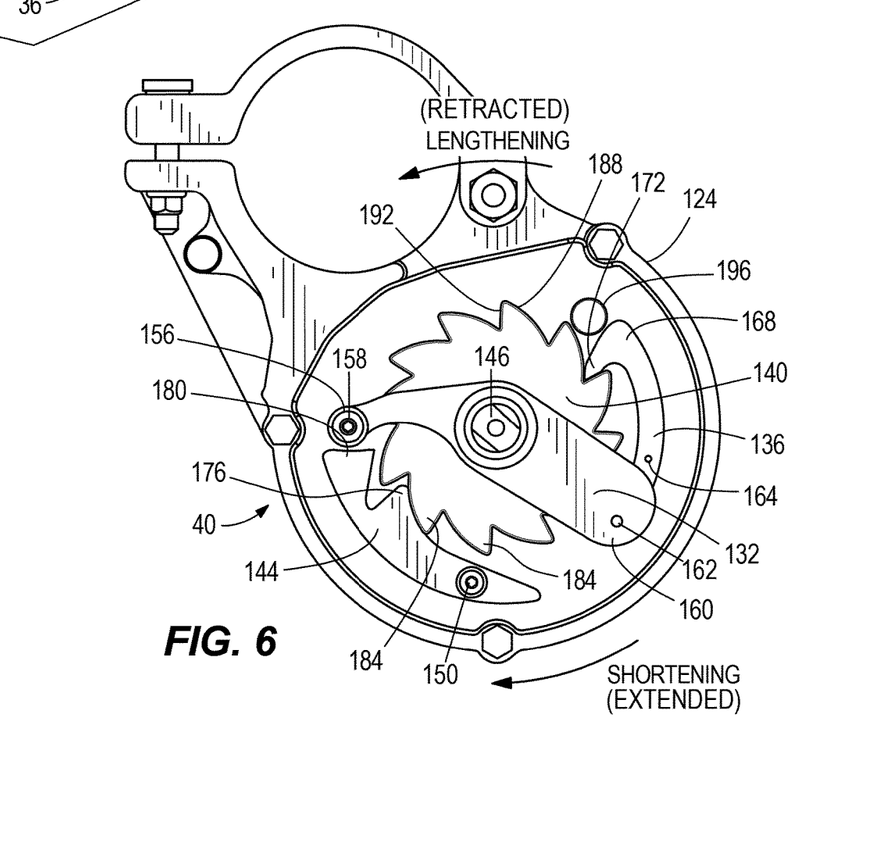
FIG. 6 is a side view of a ratchet assembly of the body tensioning mechanism of FIG. 4 according to the inventive concepts disclosed herein.

With reference to FIGS. 4-6, the body tensioning mechanism 36 is shown according to one embodiment. The body tensioning mechanism 36 includes a roller 116 rotatably supported between a pair of clamps 120. The roller 116 is coupled to the flexible body 32 in order to spool and unspool the flexible body 32 about the roller 116 as the roller 116 is rotated. The clamps 120 couple the body tensioning mechanism 36 to the aircraft seat 52. A ratchet mechanism 40 is coupled to, or in the alternative, formed as a part of, one or both of the clamps 120. The ratchet mechanism 40 includes a housing 124 having a cover plate 130, an actuator 128 pivotally supported on the housing 124, a pivotal link 132 supported within the housing 124, a ratchet pawl 136 supported within the housing 124, a ratchet gear 140 supported within the housing 124, and a locking pawl 144 supported within the housing 124. The actuator 128 is biased (e.g., by a spring such as a leaf spring) into a neutral position, and includes a user engagement lever 148 on one side of a pivot pin 146 and an operating arm 152 on an opposite side of the pivot pin 146. The pivotal link 132 is supported on the pivot pin 146 and includes a locking pawl engagement end 156 and a ratchet pawl engagement end 160 disposed on opposite sides of the pivot pin 146. The ratchet pawl 136 includes a coupling end 164 and a ratchet end 168 having a locking protrusion 172 that is engageable with the ratchet gear 140. The locking pawl 144 includes a locking protrusion 176 and a link engaging surface 180 disposed on one side of a pivot pin 150. The locking pawl 144 is biased towards the ratchet gear 140. The ratchet gear 140 includes a plurality of teeth 184 engageable with the ratchet pawl 136 and the locking pawl 144. Each tooth 184 includes a camming surface 188 and a locking surface 192.

With continued reference to FIGS. 4-6, the actuator 128 is coupled to the pivotal link 132 via a floating pin connection 158 on the locking pawl engagement end 156 of the pivotal link 132. The pivotal link 132 is also coupled to the ratchet pawl 136 via a floating pin connection 162 between the ratchet pawl 136 and the pivotal link 132 on the ratchet pawl engagement end 160 of the pivotal link 132. In this way, the actuator 128 is operatively coupled to the ratchet pawl 136.

The pivotal link 132 is also engageable with the locking pawl 144 via user actuated contact between the locking pawl engagement end 156 and the link engaging surface 180 of the locking pawl 144. As seen in FIG. 6, both the locking pawl 144 and the ratchet pawl 136 selectively engage the ratchet gear 140 via contact between the locking surfaces 192 of the teeth 184 and the locking protrusion 176 of the locking pawl 144 and the locking protrusion 172 of the ratchet pawl 136. The ratchet gear 140 is fixedly coupled to the roller 116 and rotatable about the pivot pin 146, such that rotation of the ratchet gear 140 causes rotation of the roller 116.

In operation, the actuator 128 is movable by the user to pivot in a tensioning direction (clockwise with respect to FIG. 4) to rotate the roller 116 in a shortening direction, causing an effective shortening of the flexible body 32 via spooling of the flexible body 32 about the roller 116. That is, a length of the flexible body 32 that extends over the seating area 66—or effective length—is shortened and a tension in the flexible body 32 is created. The actuator 128 is also movable in a release direction (counterclockwise with respect to FIG. 4) to permit rotation of the roller 116 in a lengthening direction, causing lengthening of the flexible body 32 via unspooling of the flexible body 32 from the roller 116. That is, the effective length of the flexible body 32 is lengthened and a tension in the flexible body 32 is released. The actuator 128 is moved via a force applied by the user to the user engagement lever 148 in either direction against the neutral bias of the actuator 128.

During movement of the flexible body 32 towards the extended position, the actuator 128 is displaced by a user in the tensioning direction. The actuator 128 pivots about the pivot pin 146 to displace the operating arm 152 in the clockwise direction shown in FIG. 6. Due to the floating pin connection between the actuator 128 and the pivotal link 132, this rotation causes the pivotal link 132 to rotate about the pivot pin 146 in a clockwise direction (e.g., such that the locking pawl engagement end 156 moves upward with respect to the position shown in FIG. 6 and the ratchet pawl engagement end 160 moves downward with respect to the position shown in FIG. 6). This movement of the pivotal link 132 moves the ratchet pawl 136 in the clockwise direction. Engagement of the locking protrusion 172 of the ratchet pawl 136 and the teeth 184 of the ratchet gear 140 causes a corresponding rotation of the ratchet gear 140 in the shortening direction. Rotation in the shortening direction causes the locking pawl 144 to cam over the teeth 184 as the ratchet gear 140 rotates to permit rotation of the ratchet gear 140. As such, the application of force on the actuator 128 in the tensioning direction drives the ratchet mechanism 40, causing rotation of the roller 116 in the shortening direction. This in turn results in spooling of the flexible body 32 about the roller 116 to shorten an effective length of the flexible body 32, thereby creating tension in the flexible body 32. When the actuator 128 reaches a limit (e.g., a physically defined movement limit or a limit defined by the user), the locking protrusion 176 of the locking pawl 144 will engage one of the locking surfaces 192 of the teeth to prevent rotation of the ratchet gear 140—and therefore the roller 116—in the lengthening direction.

The biasing force of the body return mechanism 80 acts to pull the flexible body 32 toward the retracted position. This force also acts on the roller 116 via the connection between the flexible body 32 and the roller 116. As such, the roller 116 has a torque—supplied by the body return mechanism 80 via the flexible body 32—acting to rotate the roller 116 in the lengthening direction. To halt this rotation during movement of the flexible body 32 towards the extended position, the locking pawl 144 is biased into a locked position where the locking protrusion 176 of the locking pawl 144 engages the teeth of the ratchet gear 140 to prevent rotation of the ratchet gear 140 in the lengthening direction. When the actuator 128 is released and returned to the neutral position, the ratchet gear 140 and roller 116 remain in the same rotational position via the engagement of the locking pawl 144 and the teeth 184, while the locking protrusion 172 of the ratchet pawl 136 cams over the camming surfaces 188 of the teeth 184 as the actuator 128 returns to the neutral position. A user may then selectively and incrementally actuate the actuator 128 to tension the flexible body 32, as described above, to achieve a range of positions between the retracted position (FIG. 7) and the extended position (FIG. 8) to, for example, allow the user to tension the flexible body 32 to a desired level based on user preference.

When a user actuates the actuator 128 in the release direction, the actuator 128 pivots about the pivot pin 146 to displace the operating arm 152 of the pivotal link 132 in a counterclockwise direction with respect to FIG. 6. This movement causes the locking pawl engagement end 156 to engage the link engaging surface 180 of the locking pawl 144 thereby forcing the locking pawl 144 away from and out of engagement with the ratchet gear 140. At the same time, the movement of the pivotal link 132 causes the ratchet pawl 136 to displace in the counterclockwise direction. This movement results in the ratchet pawl 136 engaging and camming over a pin 196 to release engagement between the ratchet pawl 136 and the ratchet gear 140. With the locking pawl 144 and the ratchet pawl 136 disengaged from the ratchet gear 140, the ratchet gear 140 and roller 116 are free to rotate. The ratchet gear 140 and roller 116 will rotate in the lengthening direction as a result of the flexible body 32 being biased by the body return mechanism 80 to the retracted position. Actuator 128 may then be returned to the neutral position.

Figure 7:
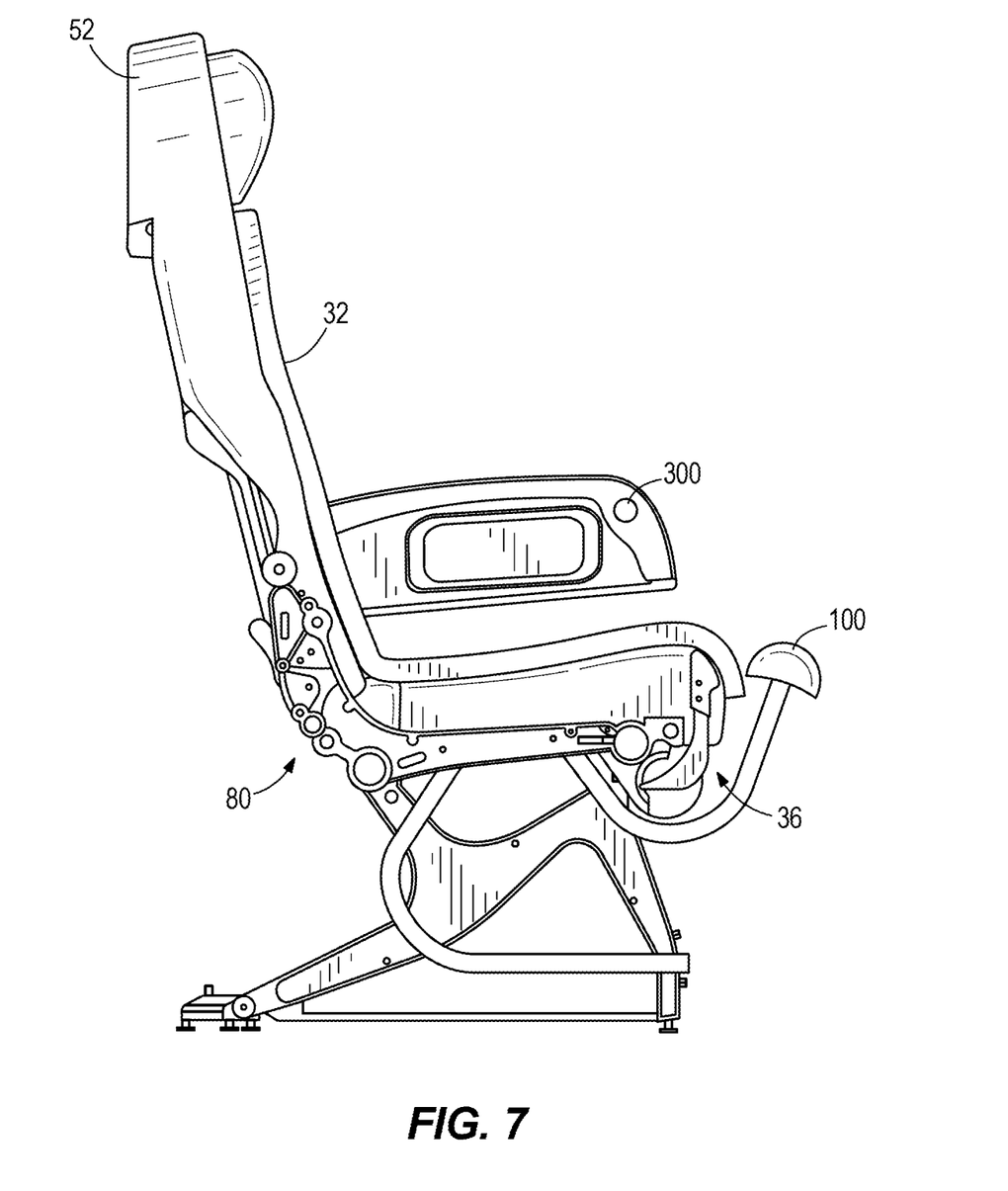
FIG. 7 is a side view of an aircraft seat including a sleep comforter in a retracted position according to the inventive concepts disclosed herein.
Figure 8:
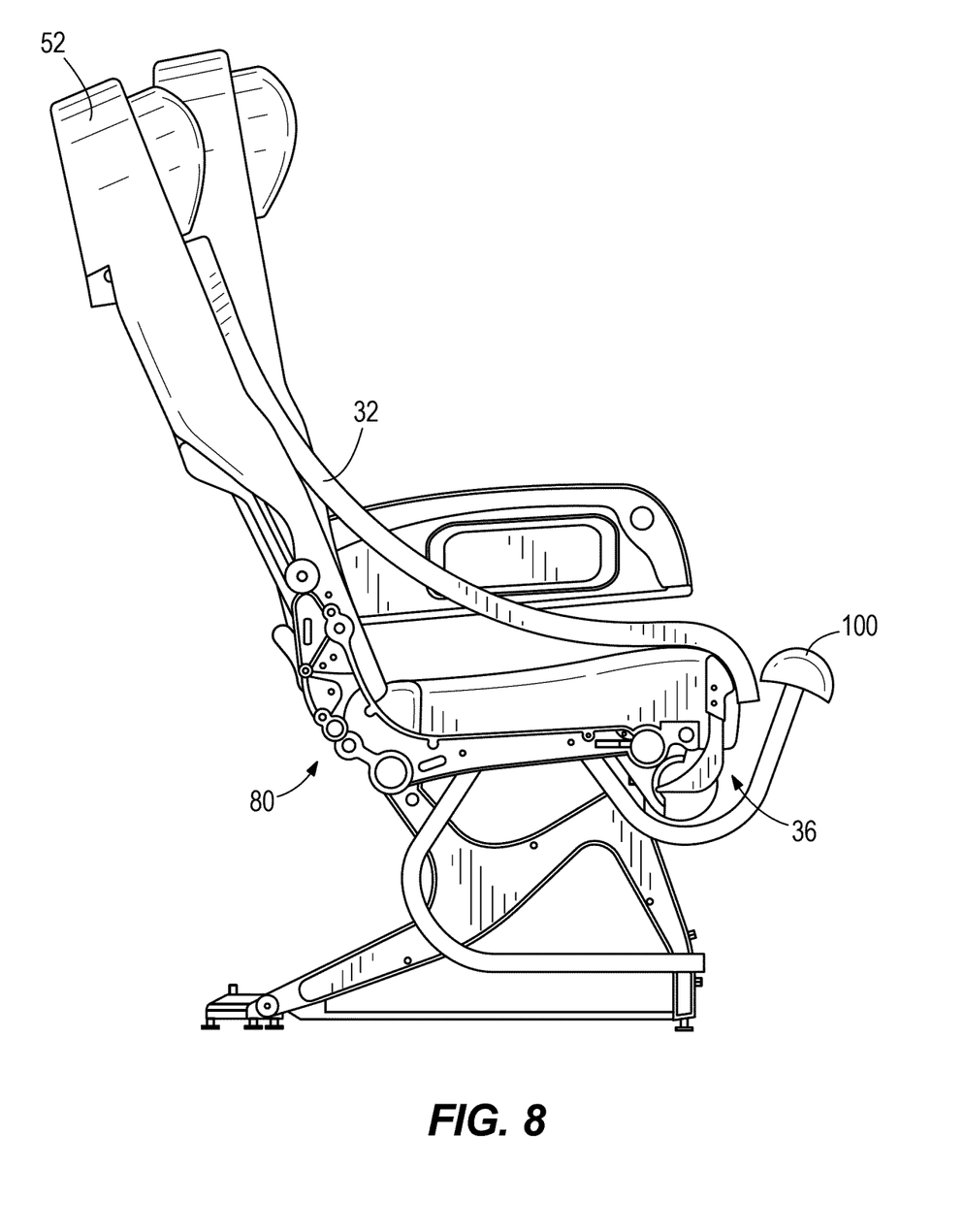
FIG. 8 is a side view of the aircraft seat of FIG. 7 including the sleep comforter in an extended position according to the inventive concepts disclosed herein.

In one embodiment, the ratchet mechanism 40 includes a release button 300. The release button 300 may be coupled to the aircraft seat 24 (FIG. 7). In another embodiment, the release button 300 may be coupled to the actuator 128, the housing 124, or the clamps 120. The release button 300 is operatively coupled to the ratchet mechanism 40 to permit free rotation of the roller 116. For example, actuation of the release button 300 may cause the locking pawl 144 and the ratchet pawl 136 to disengage from the ratchet gear 140 to permit free rotation of the roller 116. The release button 300 may be included in addition to the actuator 128 that is movable in the release direction or, in the alternative, may be included with an actuator that is not movable in the release direction such that the release button 300 is the only release mechanism.

Figure 9:
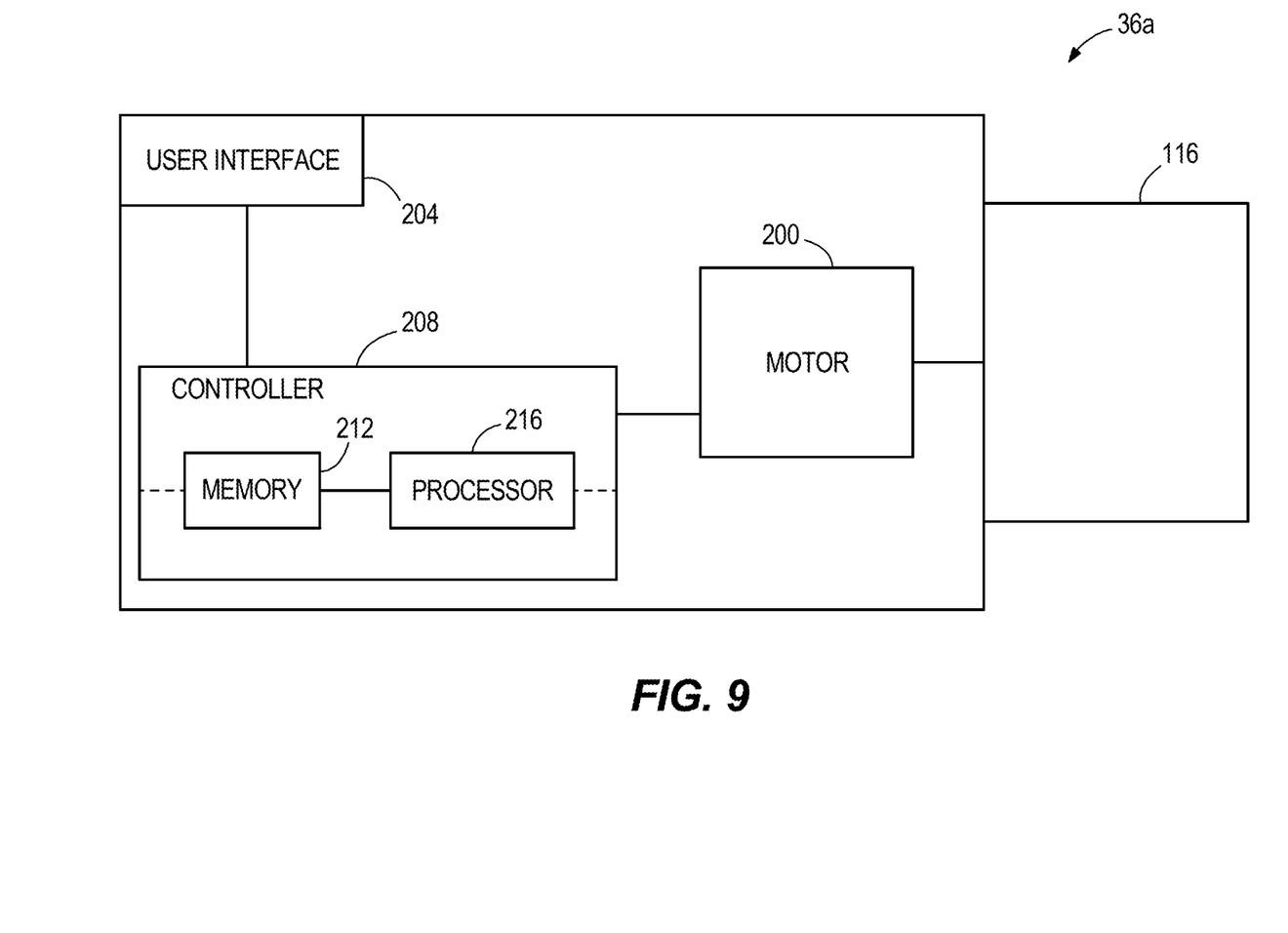
FIG. 9 is a schematic diagram of a motorized body tensioning mechanism according to the invention concepts disclosed herein.

With reference to FIG. 9, an alternate embodiment of a body tensioning mechanism is illustrated. In this embodiment, the body tensioning mechanism 36a includes a motor 200, such as an electric servomotor or stepper motor, to effectuate rotation of the roller 116. In this embodiment, the body tensioning mechanism 36a further includes a user interface 204 (e.g., a touch screen including virtual buttons, a button, a switch, a knob, etc.) that receives user input and provides the input to a controller 208. The controller 208 includes at least a memory 212 storing software instructions and a processor 216 for carrying out software-based instructions stored in the memory 212. In one example, the controller 208 receives user input to determine a set of instructions stored in the memory 212 to carry out in the processor 216 to provide an output signal to the motor 200. The output signal may be, for example, a signal causing the motor 200 to rotate the roller 116 in the tensioning direction or a signal causing the motor 200 to rotate in the release direction. The motor 200 may be coupled to the roller 116 via, for example, a ratchet mechanism to prevent rotation based on the bias provided by the body return mechanism 80. In another embodiment, the motor 200 may be held in a locked position after each successive rotation such that a ratchet mechanism 40 is unnecessary.

As described in the embodiments above, the sleep comforter 20 acts as an adjustable back support to enhance user comfort. The user may operate the body tensioning mechanism 36 to incrementally move the flexible body 32 between the retracted position, in which the flexible body 32 is held in contact with the seating area 66, and an extended position, in which the flexible body 32 is under tension and can support a user in a comfortable posture.

Based on the foregoing, it should be clear that the sleep comforter 20 may be integrally incorporated into an aircraft seat or may be retrofitted on to an existing aircraft seat.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The invention claimed is:

1. An aircraft seat comprising:
    a seatpan portion;
    a backrest portion coupled to the seatpan portion;
    a sleep comforter including:
        a flexible body configured to extend over the backrest portion and the seatpan portion, the flexible body being movable between a retracted position adjacent the backrest portion and the seatpan portion, and an extended position spaced apart from at least a portion of the seatpan portion and at least a portion of the backrest portion;
        a body tensioning mechanism including an actuator operatively coupled to a rotatable roller, the roller being coupled to an end of the flexible body, the body tensioning mechanism being configured to move the flexible body from the retracted position to the extended position; and
        a body return mechanism coupled to the flexible body, the body return mechanism comprising a rod disposed between the backrest portion and the seatpan portion and coupling members supported on the rod, the body return mechanism further including a biasing member configured to bias the flexible body towards the retracted position.

2. The aircraft seat of claim 1, wherein the body tensioning mechanism further includes a ratchet mechanism including a ratchet pawl operatively coupled to the actuator, a ratchet gear coupled to the roller and operatively engaged with the ratchet pawl, and a locking pawl engageable with the ratchet gear.

3. The aircraft seat of claim 2, wherein the actuator is operable to move in a first direction to drive rotation of the roller and ratchet gear via engagement between the ratchet pawl and the ratchet gear, and wherein the actuator is operable to move in a second direction to disengage the locking pawl from the ratchet gear to allow free rotation of the ratchet gear and roller.

4. The aircraft seat of claim 1, wherein the body tensioning mechanism further includes a ratchet device coupled to the actuator.

5. The aircraft seat of claim 1, further comprising a frame supporting the backrest portion and the seatpan portion, wherein the body tensioning mechanism is coupled to the frame adjacent the seatpan portion.

6. The aircraft seat of claim 1, wherein the flexible body is coupled to the backrest portion of the aircraft seat adjacent to a headrest disposed on the backrest portion.

7. A sleep comforter for an aircraft seat, the sleep comforter comprising:
    a flexible body configured to be coupled to the aircraft seat so as to extend over a seat area of the aircraft seat between a backrest portion of the aircraft seat and a seatpan portion of the aircraft seat, the flexible body being movable between a retracted position adjacent to the backrest portion and the seatpan portion, and an extended position spaced apart from at least a portion of the seatpan portion and at least a portion of the backrest portion;
    a body tensioning mechanism including an actuator operatively coupled to a roller to drive rotation of the roller, wherein the roller is coupled to the flexible body, the body tensioning mechanism being configured to move the flexible body between the retracted position and the extended position; and a body return mechanism coupled to the flexible body, the body return mechanism comprising a rod configured to be disposed between the backrest portion and the seatpan portion and coupling members supported on the rod, the body return mechanism further including a biasing member configured to bias the flexible body towards the retracted position.

8. The sleep comforter of claim 7, wherein the tensioning mechanism further includes a ratchet device coupled to the actuator.

9. The sleep comforter of claim 7, wherein the flexible body includes a plurality of layers of material.

10. The sleep comforter of claim 9, wherein at least one of the plurality of layers is a foam layer.

11. A sleep comforter for an aircraft seat, the sleep comforter comprising:
 a flexible body configured to be coupled to the aircraft seat so as to extend over a seat area of the aircraft seat between a backrest portion of the aircraft seat and a seatpan portion of the aircraft seat, the flexible body being movable between a retracted position adjacent to the backrest portion and the seatpan portion, and an extended position spaced apart from at least a portion of the seatpan portion and at least a portion of the backrest portion;
 a body tensioning mechanism including an actuator operatively coupled to a roller, the roller being coupled to an end of the flexible body, the body tensioning mechanism being configured to move the flexible body from the retracted position to the extended position; and a body return mechanism coupled to the flexible body, the body return mechanism comprising a rod disposed between the backrest portion and the seatpan portion and coupling members supported on the rod, the body return mechanism further including a biasing member configured to bias the flexible body towards the retracted position.

12. The sleep comforter of claim 11, wherein the body tensioning mechanism further includes a ratchet mechanism including a ratchet pawl operatively coupled to the actuator, a ratchet gear coupled to the roller and operatively engaged with the ratchet pawl, and a locking pawl engageable with the ratchet gear.

13. The sleep comforter of claim 12, wherein the actuator is operable to move in a first direction to drive rotation of the roller and ratchet gear via engagement between the ratchet pawl and the ratchet gear, and wherein the actuator is operable to move in a second direction to disengage the locking pawl from the ratchet gear to allow free rotation of the ratchet gear and roller.

14. The sleep comforter of claim 11, wherein the flexible body includes a foam layer and a fabric layer.

15. The sleep comforter of claim 11, wherein the body tensioning mechanism includes a release position permitting free rotation of the roller such that, in the release position, the bias of the body return mechanism draws the flexible body into the retracted position.

* * * * *